United States Patent [19]

Kempster

[11] Patent Number: 4,702,428

[45] Date of Patent: Oct. 27, 1987

[54] INFINITELY VARIABLE RATIO DRIVE MECHANISM

[75] Inventor: Roger B. Kempster, Brookmans Park, England

[73] Assignee: Allen Coding Machines Limited, Hertfordshire, England

[21] Appl. No.: 878,829

[22] Filed: Jun. 26, 1986

[30] Foreign Application Priority Data

Jun. 28, 1985 [GB] United Kingdom ................ 8516400

[51] Int. Cl.⁴ .................... B65H 20/04; F16H 29/20; F16H 35/08

[52] U.S. Cl. .................................. 242/67.2; 74/121; 74/834; 242/67.3 R; 242/75.4

[58] Field of Search .............. 242/196, 67.3 R, 67.2, 242/75.4; 226/156, 157, 141, 142; 74/834, 109, 98, 121, 119

[56] References Cited

U.S. PATENT DOCUMENTS

| | | | |
|---|---|---|---|
| 883,538 | 3/1908 | Graser | 226/141 X |
| 1,187,848 | 6/1916 | Landis | 74/121 X |
| 1,189,309 | 7/1916 | Taylor | 242/67.3 R |
| 2,262,915 | 11/1941 | Bobst | 226/157 X |
| 2,765,022 | 10/1956 | Bergevin | 74/121 X |
| 3,076,368 | 2/1963 | Groll | 226/141 X |
| 3,092,347 | 6/1963 | Kingsley | 242/67.2 |
| 3,371,883 | 3/1968 | Hoffman et al. | 242/67.3 R |
| 3,482,800 | 12/1969 | Barnett et al. | 242/75.4 X |
| 3,517,872 | 6/1970 | Chmela | 226/141 X |
| 3,650,449 | 3/1972 | Mundus | 226/142 |
| 4,065,043 | 12/1977 | Ohashi | 226/141 |

FOREIGN PATENT DOCUMENTS 502069 11/1954 Italy .......................................... 74/98

*Primary Examiner*—Stuart S. Levy
*Assistant Examiner*—Joseph J. Hail, III
*Attorney, Agent, or Firm*—Dowell & Dowell

[57] ABSTRACT

A variable ratio drive mechanism comprises a reciprocable input member having a toothing, an output gear and an intermediate pivoted gear meshing with the toothing of said input member and said output gear to effect a driving connection between the input member and the output gear. An adjustment device is provided for selectably positioning the pivot of said intermediate gear whereby the distance between the pivot of the intermediate gear and the point of meshing engagement of the intermediate gear and the output gear can be infinitely varied. Preferably the pivot can be moved through a mid-position to positions either side of the mid-position.

8 Claims, 2 Drawing Figures

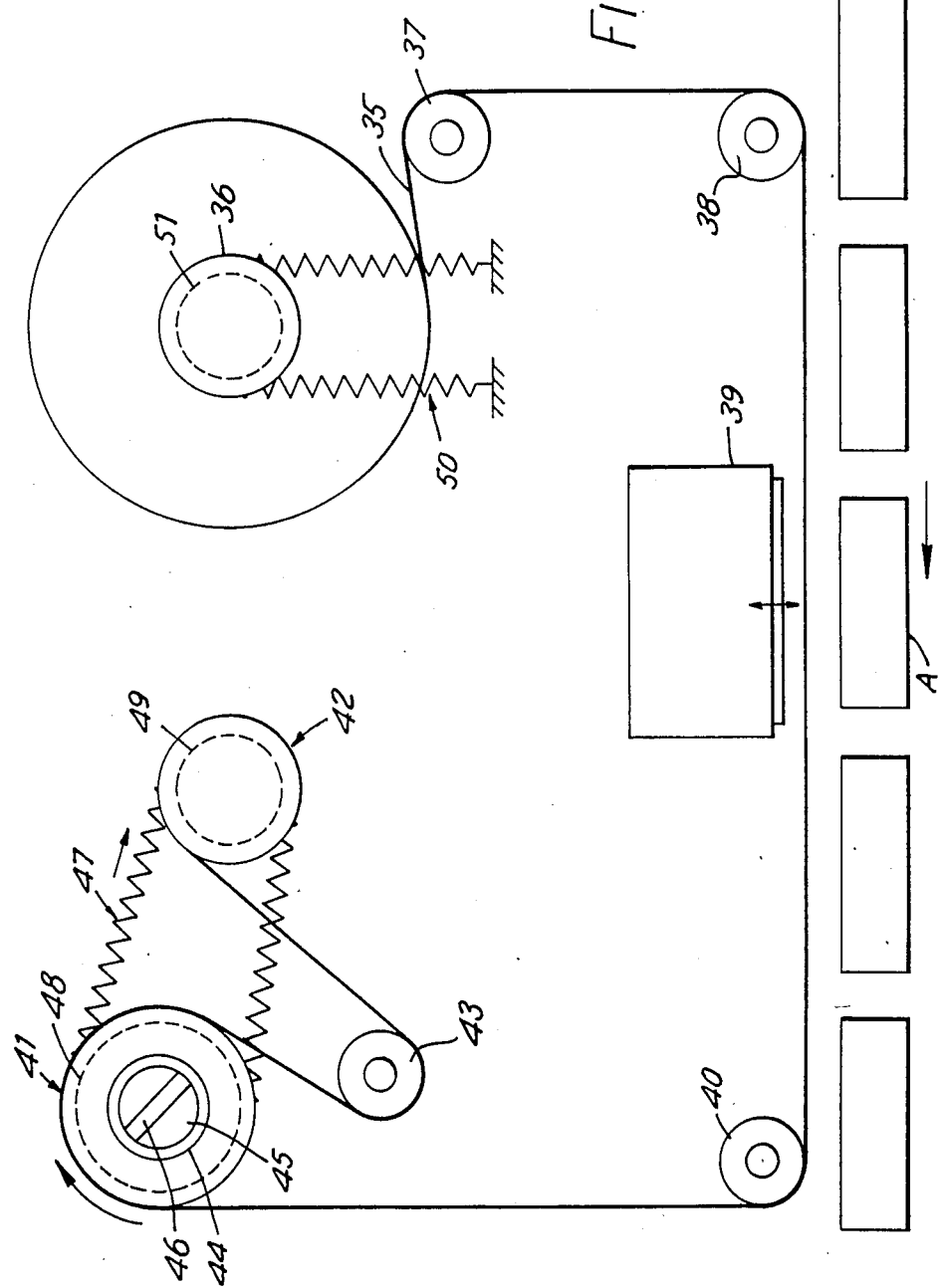

INFINITELY VARIABLE RATIO DRIVE MECHANISM

BACKGROUND TO THE INVENTION

This invention relates to a gear drive mechanism for transforming linear or angular input to rotational drive output.

STATEMENT OF PRIOR ART

The transformation of a linear constant rack movement to an angular drive can readily be achieved by suitable gearing. Such a system will only produce a fixed angular rotation for the constant amplitude movement of the rack and a modified gear train is required to vary the angular rotation.

OBJECT OF THE INVENTION

An object of the invention is to provide a drive mechanism in which the angular extent of rotation may be infinitely varied in relation to a constant linear or angular movement at the input.

SUMMARY OF THE INVENTION

According to the invention there is provided a drive mechanism comprising a housing, a rotatable or reciprocable input member in said housing, including a toothed rack, an output gear rotatably mounted in the housing, and intermediate pivoted gear which is truncated to form a bar having a gear segment at each end, one gear segment meshing with the toothed rack and the other gear segment meshing with said output gear and effecting a driving connection between the input member and the output gear, and adjustable means for selectably positioning the pivotal axis of said intermediate gear whereby the distance between the pivotal axis of the intermediate gear and the point of meshing engagement of the intermediate gear and the output gear can be infinitely varied.

Preferably the pivotal axis can be moved through the central axis on either side thereof along a diametrical plane.

BRIEF DESCRIPTION OF DRAWINGS

An embodiment of the invention will now be described with reference to the accompanying drawings in which:

FIG. 2 is a tape tensioning mechanism driven by said gear mechanism.

DESCRIPTION OF PREFERRED EMBODIMENT

Figure 1:
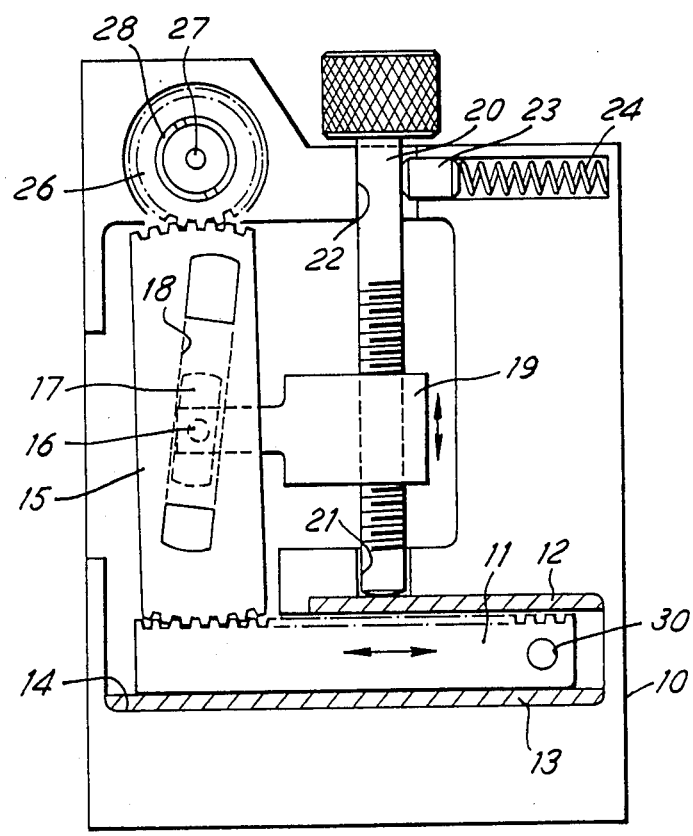
FIG. 1 is an elevation of the gear mechanism with the cover plate removed.

As shown in FIG. 1 a housing 10 contains an input gear in the form of a toothed rack 11 slidable between fibre plates 12, 13, (e.g. Tufnol, Registered Trade Mark) located in a recess 14.

The rack 11 is in engagement with an intermediate gear 15 which has been truncated to form a bar having a gear segment at each end. The gear 15 is pivotable about a spindle 16 carried by a block 17 which can slide axially of the bar in a slot 18. The spindle 16 also passes through an aperture in a block 19 which is adjustable by means of a screw 20 engaging a thread in the block. The lower end of the screw 20 is located in a recess 21 whereas the upper end is held in a groove 22 by means of a spacer 23 and a spring 24.

The gear 15 meshes with an output gear 26 rotatable about a spindle 27 mounted on the housing 10. An output shaft 28 is attached to the gear 26 and serves for connection to the mechanism to be driven such as a tape device and tensioning mechanism to be described later.

A constant amplitude reciprocating movement of the rack 11 is produced by any suitable drive means e.g. a double acting air cylinder drive which could be connected by way of an aperture 30 formed in the rack 11. This rack motion is transmitted via the intermediate gear 15 to the output drive gear 26. The angular rotation produced at gear 26 is dependent upon the position of the pivot 16 in the slot 18. By incorporating the screw adjustment to vary the position of the pivot the output rotation can be rapidly adjusted to produce the required degree of angular reciprocating output rotation.

The above variable drive mechanism may serve to drive a tape feed mechanism of an over-printing machine where articles (A) are conveyed past a printing head.

A coated tape 35 is fed from a spool 36 and passes around guide rollers 37, 38 to a printing head 39. From the printing position the tape proceeds around a guide roller 40 and a drive roller 41 and is taken up by a take-up spool 42 after passing around a further guide roller 43. The drive roller 41, which has a coating of rubber or other non-slip material, is provided with a sprag clutch 44 having an input shaft 45 shaped with a dog 46 which is engaged by the output shaft 28.

The take-up spool 42 is driven via a spring belt 47 and pulleys 48, 49 connected respectively to the drive roller 41 and take-up spool 42. In order to maintain the tape taut after each intermittent forward drive of the tape, one pulley 49 is smaller than the other. The belt can slip to accommodate the increase in the takeup spool as it fills.

To prevent the spool 36 from over-running after each intermittent drive forward a friction spring belt 50 is provided which passes over a pulley 51 attached to the spool 36 and is secured under tension to a fixed part of the tape feed mechanism.

Alternatively, the printing head may be located between the roller 40 and the drive roller 41.

This arrangement eliminates any contact of the coated side of the tape with either the rubber drive 41 roller or tape guide rollers and also provides good tape control (tracking) and tension during indexing. The incorporation of a tension coil spring on the feed spool produces an automatic recoil back tension on the tape and coupled with the overdrive of the take-up roller the need for the traditional pair of pinch rollers is eliminated.

With the variable drive mechanism in combination with the tape feed mechanism it is possible to provide an accurate indexing of the intermittent tape feed to the intermittent feed of the articles.

I claim:

1. A variable ratio drive mechanism comprising
   (a) a housing,
   (b) an input member in said housing, including a toothed rack,
   (c) an output gear rotatably mounted in the housing,
   (d) an intermediate pivoted gear which is truncated to form a bar having a gear segment at each end, one gear segment meshing with said toothed rack and the other gear segment meshing with said output gear and effecting a driving connection between said input member and said output gear, and (e) adjustable means for selectively positioning the pivotal axis of said intermediate gear whereby the distance between the pivotal axis of said intermediate gear and the point of meshing engagement of said intermediate gear and said output gear can be infinitely varied.

2. A drive mechanism according to claim 1, including a first block which can adjustably slide lengthwise of the bar in a slot formed in and extending longitudinally of said bar, a second block movable in said housing to a desired position by means of said adjustable means, and a spindle for pivoting said intermediate gear carried by said first block, which spindle passes through an aperture in said second block.

3. A drive mechanism according to claim 2, wherein said adjustable means is in the form of a manually rotatable screw engaging a thread in said block.

4. A drive mechanism according to claim 1, wherein said output gear is rotatable about a spindle mounted on the housing, said output gear having attached thereto an output shaft serving for connection to the mechanism to be driven.

5. A tape feed mechanism of an over-printing machine in which articles are conveyed intermittently past a printing head, said tape feed mechanism comprising means for supplying and guiding a tape from a feed spool to a printing head; a drive roller; a take-up spool down stream of said driven roller, said drive roller being provided with a one-way clutch having an input shaft; and a drive mechanism having housing, a rotatable or reciprocable input member in said housing, an output gear rotatably mounted in the housing and in driving engagement with said input shaft, and an intermediate pivoted gear meshing with said output gear and effecting a driving connection between the input member and the output gear, and an adjustable means for selectably positioning the pivotal axis of said intermediate gear whereby the distance between the pivotal axis of the intermediate gear and the point of meshing engagement of the intermediate gear and the output gear can be infinitely varied.

6. A tape feed mechanism according to claim 5, wherein pulleys are connected respectively to the drive roller and take-up spool; and a spring belt passes around the pulleys.

7. A tape feed mechanism according to claim 6, wherein in order to maintain the tape taut after each intermittent forward drive of the tape, one pulley is smaller than the other, the belt being able to slip to accommodate the increase in the take-up spool as it fills.

8. A tape feed mechanism according to claim 7, wherein to prevent the feed spool from over-running after each intermittent drive forward a friction spring belt is provided which passes over a pulley attached to the feed spool and is secured under tension to a fixed part of the tape feed mechanism.

* * * * *